US008582936B2

(12) United States Patent
Ruggiero et al.

(10) Patent No.: US 8,582,936 B2
(45) Date of Patent: Nov. 12, 2013

(54) SEPARATING AND COMBINING SINGLE-MODE AND MULTIMODE OPTICAL BEAMS

(75) Inventors: Anthony J. Ruggiero, Livermore, CA (US); Donald A. Masquelier, Tracy, CA (US); Jeffery B. Cooke, Knightsen, CA (US); Jeffery S. Kallman, Plesanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 278 days.

(21) Appl. No.: 13/071,382

(22) Filed: Mar. 24, 2011

(65) Prior Publication Data
US 2011/0235972 A1    Sep. 29, 2011

Related U.S. Application Data

(60) Provisional application No. 61/317,576, filed on Mar. 25, 2010.

(51) Int. Cl.
*G02B 6/26*    (2006.01)
(52) U.S. Cl.
USPC .................................. 385/39; 385/29; 385/44
(58) Field of Classification Search
None
See application file for complete search history.

(56) References Cited

U.S. PATENT DOCUMENTS

| 4,021,099 | A  | * | 5/1977  | Kawasaki et al. ............... 385/35 |
| 4,149,770 | A  | * | 4/1979  | Milton et al. ................... 385/47 |
| 4,191,446 | A  | * | 3/1980  | Arditty et al. ................... 385/42 |
| 4,314,740 | A  | * | 2/1982  | Bickel ............................. 385/47 |
| 4,750,795 | A  | * | 6/1988  | Blotekjaer ...................... 385/24 |
| 5,146,516 | A  | * | 9/1992  | Blumke et al. .................. 385/36 |
| 5,170,458 | A  | * | 12/1992 | Aoyagi et al. ................. 385/127 |
| 5,627,934 | A  | * | 5/1997  | Muhs ............................ 385/127 |
| 6,381,045 | B1 | * | 4/2002  | DiGiovanni et al. ........... 398/42 |
| 6,832,859 | B1 | * | 12/2004 | Bell et al. ........................ 385/78 |
| 7,995,883 | B2 | * | 8/2011  | Lee et al. ........................ 385/39 |
| 8,064,745 | B2 | * | 11/2011 | Fortusini et al. ............... 385/37 |
| 2008/0304074 | A1 | * | 12/2008 | Brennan, III ................. 356/451 |
| 2009/0041415 | A1 | * | 2/2009  | Tanobe et al. ................. 385/127 |
| 2009/0097806 | A1 | * | 4/2009  | Viellerobe et al. ............ 385/116 |

FOREIGN PATENT DOCUMENTS

| JP | 60-221706 A  | * | 11/1985 |
| JP | 2001-196666 A | * | 7/2001  |

* cited by examiner

*Primary Examiner* — Mike Stahl
(74) *Attorney, Agent, or Firm* — John P. Wooldridge

(57) ABSTRACT

Techniques for combining initially separate single mode and multimode optical beams into a single "Dual Mode" fiber optic have been developed. Bi-directional propagation of two beams that are differentiated only by their mode profiles (i.e., wavefront conditions) is provided. The beams can be different wavelengths and or contain different modulation information but still share a common aperture. This method allows the use of conventional micro optics and hybrid photonic packaging techniques to produce small rugged packages suitable for use in industrial or military environments.

18 Claims, 2 Drawing Sheets

SEPARATING AND COMBINING SINGLE-MODE AND MULTIMODE OPTICAL BEAMS

CROSS-REFERENCE TO RELATED APPLICATIONS

This application claims the benefit of U.S. Provisional Patent Application No. 61/317,576 titled "Method For Separating and Combining Single-Mode and Multimode Optical Beams," filed Mar. 25, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to boresight alignment issues in bidirectional fiber coupled systems with asymmetric fiber core diameters, e.g., free space optical communication systems, and more specifically, it relates to techniques for combining and separating the optical output from multimode and single mode fiber coupled sources.

2. Description of Related Art

Free space optics (FSO) is a telecommunication technology that uses light propagating in free space to transmit data between two points. The technology can be useful where the physical connection of the transmit and receive locations is difficult. For example, in cities, the laying of fiber optic cables can be expensive and, in some instances, impractical based upon the infrastructure already built.

Free space optics can also be used to communicate between spacecraft, since outside of the atmosphere there is little to distort the signal. Such systems can also be used in aircraft if the system is designed to track the position of the first location (e.g., the vehicle) with respect to the position of the second location (e.g., a ground station receiver or transceiver). In some instances, the optical links use infrared laser light. Communication is also possible using light emitting diodes (LEDs) or other light sources, in some systems. The beams of light in FSQ systems are transmitted by light focused on receivers. These receivers can, for example, be telescopic lenses able to collect the photon stream and transmit digital data. The data can be any item of information that can be transmitted on a communication system. For example, types of data can include one or more application programs (i.e., sets of executable instructions), files to be executed by such programs, or data, among other types. Files to be executed can, for example, take the form of Internet messages, video images, radio signals, or computer files, among other items.

Boresight alignment of dual core fiber ports has been a significant issue in free space optical communications systems. It is desirable to simplify the current optical systems and to significantly reduce their weight and power usage. It is also desirable to improve the performance of the current systems.

SUMMARY OF THE INVENTION

It is an object of the present invention to solve the problem of heterogeneous fiber coupled transceiver boresight alignment in free space optical communications systems.

Another object is to provide techniques for separating and combining single-mode and multimode optical beams.

These and other objects will be apparent based on the disclosure herein.

The invention addresses the general problem of combining the optical output from multimode (MM) and single mode (SM) fiber coupled sources for transport to a common location and subsequent separation of the respective beams at their destination. A critical aspect of this is that the single mode beam remains single mode during transport. Embodiments use a fiber with a dual single mode/multimode core, i.e., the smaller single mode core (e.g., 9 µm diameter) is concentric with the much larger multimode core (e.g., 62.5 µm micron diameter) for the transport. Embodiments of the invention couple a single mode fiber output of a source fiber into a single mode core of a dual fiber. In these embodiments, a multimode output of a multimode source fiber is coupled into a multimode core of the dual core fiber. In some embodiments, the single mode source beam is simply transmitted through a hole in a high reflecting coating on the dual core fiber face. The multimode beam is reflected from the surface, through a window formed in the fiber cladding. The window on the dual core fiber is formed in the cladding of the multimode fiber by removing the buffer and providing an anti-reflection (AR) coating on the window to minimize loss. Although ball lenses are shown in some illustrations, other lenses are usable, e.g., GRIN lenses and micro-optical lenses could also be used. The fiber implementation geometry is only one embodiment. The input SM and MM source fibers can be configured to be collinear with the dual core fiber. One source fiber can be collinear and the other could be at 180 degrees. These alternate packaging geometries can be accomplished, e.g., using one or more micro-mirrors, one or more micro-prism assemblies or one or more dichroic filters.

In a fabrication method, a dual mode fiber is cleaved flat. The fiber face is then polished to an angle of 15 to 45 degrees normal to the face. (The face angle will depend on the application.) Masking material is then placed over the single mode core section on the external face. A high reflectivity coating is then deposited on the fiber face to obtain a greater than 95% reflectivity at the desired wavelength. An appropriate anti-reflection (AR) coating is applied to the single mode portion of the fiber face over-coating the high reflection portion. The fiber now has effectively an internal mirror that will reflect light from the multimode portion of the fiber approximately 90 degrees out the side of the fiber. The light transitioning from the fiber to air encounters the cylindrical side of the fiber and imparts an elliptical component to the light. The exiting beam is then reshaped using a custom cylindrical lens to reformat it and focus it into, e.g., a graded index 62.5-micron multimode core of the orthogonal accepting fiber.

A separate micro-optic lens, e.g., a ball lens that has been anti-reflection coated at the appropriate wavelength, can be used to focus a single mode beam emitted from a SM fiber through the AR coated (masked) portion of the dual mode fiber angled face. The single mode fiber is aligned nearly normal to the dual mode face. Once the alignment has been verified the system is fixed using conventional micro-bench techniques.

The invention has a variety of applications, including mono-static (single aperture telescope) free space optical (FSO) transceivers with single mode transmitters and multimode receivers, LIDAR and LADAR transceivers for remote sensing applications and applications involving convergence of multimode and single mode local area network traffic.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention provides techniques for combining initially separate single mode and multimode optical beams into a single "Dual Mode" fiber optic. The invention further provides techniques that use the dual mode fiber optic for separating single mode and multimode beams. The invention allows for bi-directional propagation of two beams that are differentiated only by their mode profiles (i.e., wavefront conditions). The beams can also be different wavelengths and/or contain different modulation information but still share a common aperture. This method allows the use of conventional micro optics and newer hybrid photonic packaging techniques to produce small rugged sealed packages suitable for use in industrial or military environments.

Embodiments of the invention use an angle polished "dual mode" fiber that has been cut and polished to an angle of 15 to 45 degrees normal to the face. The angle will depend on application. The face of the fiber has masking material placed over the single mode core section and then a high reflectivity coating is deposited on the exposed portion of the fiber face. The mask is then removed and an appropriate anti-reflection coating is applied to the single mode portion of the fiber face. Two micro optic lenses can be used couple the single mode and the multimode fiber optics to the dual mode fiber. The single mode fiber can be aligned nearly normal to the dual mode face, and the multimode fiber can be placed at an angle approximately 90 degrees from the axis of the dual mode fiber. Once the alignment has been verified the system can be fixed using conventional micro-bench techniques.

Typical uses are as combiners to allow propagation of two light sources on the same fiber. A novel use will be to permit "aperture sharing" such as in free space optical link systems, thereby reducing the task of having separate pointing systems for the transmit and receive optics. Reducing size (and cost) and increasing ruggedness is key to the next generation systems and this method is an ideal way to achieve that goal. Commercial "Last Mile" optical links used to connect commercial buildings together where conventional internet or communications wiring is cost prohibitive, will be able to use this technology. The issue of having to point and track multiple apertures is a common costly problem in commercial systems as well.

Figure 1:
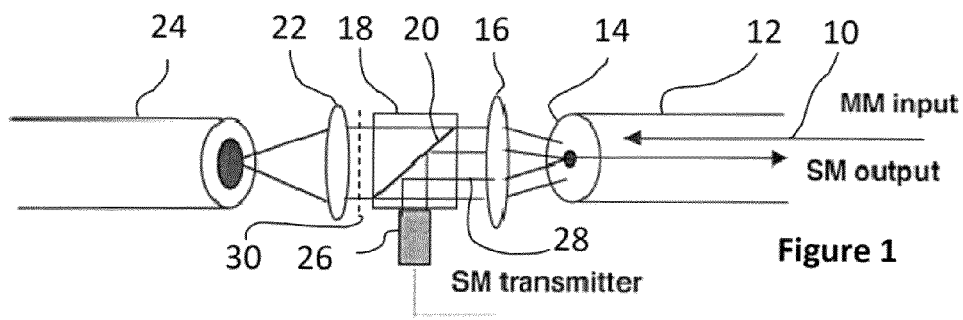
FIG. 1 shows a dual mode fiber providing a multimode beam into a graded index multimode fiber and receiving and transporting a single mode beam from a single mode fiber.

FIG. 1 illustrates an embodiment where a multimode beam and a single mode beam travel in opposite directions within a dual mode fiber. Multimode light 10 traveling in dual mode fiber 12 exits the fiber face 14, is collimated by microlens 16, propagates through beam splitting cube 18 (which includes a reflecting interface 20), and is then focused by microlens 22 into the core of multimode fiber 24. Note that the microlenses and the beam splitting cube are exemplary and can be replaced by other elements that will be apparent to those skilled in the art based on the disclosure herein. A source 26 provides single mode light 28 which is directed by reflecting interface 20 to microlens 16 and into the single mode core of dual mode fiber 12. Thus, single mode light 28 and multimode light 10 travel in opposite directions in dual mode fiber 12.

For use in the embodiment of FIG. 1, dual mode fiber 12 is cleaved flat. In an embodiment, the buffer is removed and a reflective coating is deposited onto the length of the fiber. The reflective coating comprises a material that is reflective at the desired wavelength of the multimode light that will propagate in the fiber. In other embodiments, the cladding remains and no reflective coating is deposited onto the cladding. The portion of the cleaved face of the fiber is not coated with a reflective coating as in some other embodiments. To optimize the transmission of light, the end of the multimode portion may be coated with an AR coating selected to transmit multimode light 10 and the end of the single mode core of dual mode fiber 12 may be AR coated to transmit single mode light 22. These coatings may be different or a dichroic coating may be applied. Note that the positions of the single mode source and the multimode fiber can be reversed with appropriate changes to the system, which changes would be apparent to those skilled in the art based on the disclosure herein.

FIG. 1 can also be used to illustrate an embodiment of the invention where multimode light and single mode light both travel in the same direction in dual mode fiber 12 and are separated by the dichroic beam splitting cube 18 (or by an equivalent element). Reversing the direction of single mode light 28 in dual mode fiber 12, a portion of single mode light 28 will be reflected by reflective interface 20. A filter 30 that prevents transmission of the wavelength of single mode light 28 but allows transmission of multimode light 10 can be inserted in the system. Alternately the reflectivity of reflective interface 20 can be optimized to reflect the single mode light and to transmit the multimode light. A microlens can be operatively placed to collect single mode light 28 after it is reflected by reflective interface 20. The collected light can be, e.g., focused into a single mode fiber. Multimode light 10 is focused into multimode fiber 24. Note that the positions of the means for collecting the single mode light the multimode fiber can be reversed with appropriate changes to the system, which changes would be apparent to those skilled in the art based on the disclosure herein.

Another embodiment enabled by the configuration of FIG. 1 combines both the single mode and multimode beams in the dual mode fiber by propagating the multimode light from the multimode fiber.

Figure 2:
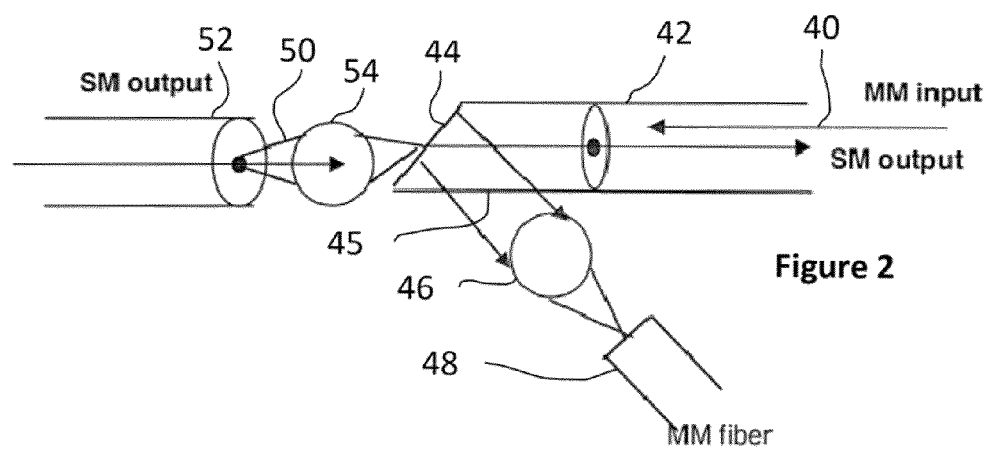
FIG. 2 illustrates an exemplary embodiment of the present invention utilizing a single mode input focused by a ball lens into the single mode core of a dual mode fiber, and further shows a multimode beam reflected from the angled surface of the dual mode fiber to a ball lens that focuses the multimode beam into a multimode fiber.

FIG. 2 shows multimode light 40 traveling from left to right in dual mode fiber 42. The multimode light is reflected at exit face 44, passes through a window 45, is collected by ball lens 46 and focused into multimode fiber 48. In an embodiment of the invention, window 45 is formed by removing the cladding at that area and applying an antireflection coating. Single mode light 50 exiting single mode fiber 52 is focused by ball lens 54 into the single mode core of dual mode fiber 42. In this embodiment, dual mode fiber 42 is prepared by removing the buffer, cleaving the fiber at an angle, providing a reflective coating on the multimode portion of the exit face and an AR coating on the single mode core of the dual mode fiber and depositing an appropriate reflective coating on the length of the dual mode fiber. Thus, the single mode light and the multimode light travel in opposite directions in the dual mode fiber.

Note that the configuration of FIG. 2 can be used to combine the multimode light and the single mode light such that they travel in the same direction in dual mode fiber. This is accomplished by providing the multimode light from the multimode fiber.

Figure 3:
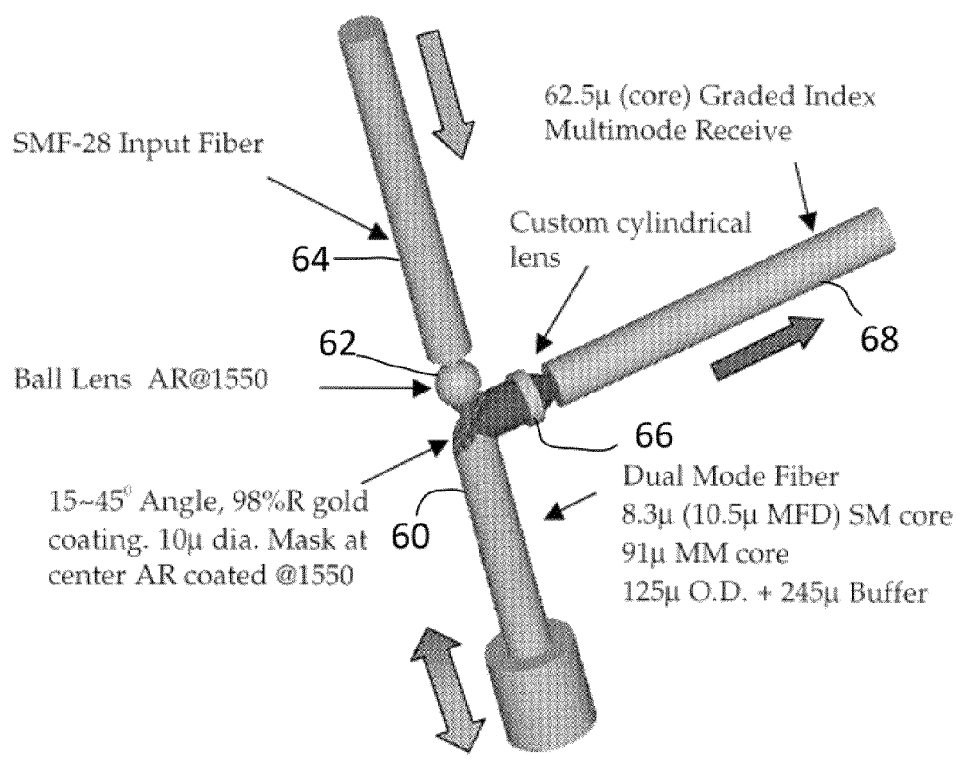
FIG. 3 shows a fiber implementation utilizing a dual fiber having an angled face.

In FIG. 3, shows a specific embodiment that utilizes a dual mode fiber 60 that has an 8.3 µm single mode core 9.5 mode field-diameter (MFD) 91 µm MM core and has a 125 µm outside diameter and originally had a 245 µm buffer, which was removed to allow the deposition of a reflective coating. The dual mode fiber includes an angled face (~15°-45°, 98% R gold coating, 10 µm diameter center AR coated at 1550 nm). The ball lens 62 is AR coated at 1550 nm. The single mode input fiber 64 is an SMF-28 as is known in the art. A custom cylindrical lens 66 collects light reflected from the angled face of the dual mode fiber. A 62.5 µm core graded index multimode fiber 68 is positioned to collect light from the cylindrical lens. As in previously described embodiments, multimode light from the dual mode fiber can be directed into the multimode fiber and single mode light from the single mode fiber can be directed into the dual mode fiber. Alternately, light from the multimode fiber can be combined in the dual mode fiber with the light from the single mode fiber.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
    a single mode central core terminating at a first area of an angled end face;
    a multimode outer core concentric to said central core and terminating at a second area of said angled end face;
    a reflective coating on said second area;
    a cladding surrounding said outer core; and
    a window in said cladding that allows transmission of light.

2. The apparatus of claim 1, further comprising an antireflection (AR) coating on said first area.

3. The apparatus of claim 1, wherein said angled end face comprises an angle that will reflect light propagating in said outer core toward said window, wherein said light will transmit through said window.

4. The apparatus of claim 3, further comprising a multimode fiber optic, wherein said apparatus further comprises an optic positioned to direct said light into said multimode fiber after said light transmits through said window.

5. The apparatus of claim 4, wherein said optic is selected from the group consisting of a ball lens, a GRIN lens and micro-optical lens.

6. The apparatus of claim 4, wherein said optic comprises an antireflection coating.

7. The apparatus of claim 1, wherein said window comprises an antireflection coating.

8. The apparatus of claim 1, further comprising a single mode fiber optic, wherein said apparatus further comprises an optic positioned to direct single mode light from said single mode fiber optic into said single mode core.

9. The apparatus of claim 8, wherein said optic comprises an antireflection coating.

10. The apparatus of claim 1, wherein said angled end face comprises an angle that will reflect multimode light transmitting through said window toward said angled end face, wherein said light will propagate in said outer core.

11. The apparatus of claim 10, further comprising a multimode fiber optic, wherein said apparatus further comprises an optic positioned to direct said multimode light through said window toward said angled end face.

12. The apparatus of claim 11, wherein said optic is selected from the group consisting of a ball lens, a GRIN lens and micro-optical lens.

13. The apparatus of claim 11, wherein said optic comprises an antireflection coating.

14. The apparatus of claim 1, further comprising a single mode fiber optic, wherein said apparatus further comprises an optic positioned to direct single mode light from said single mode core into said single mode fiber optic.

15. The apparatus of claim 14, wherein said optic comprises an antireflection coating.

16. The apparatus of claim 4, wherein said optic comprises a cylindrical lens.

17. A dual mode fiber optic, comprising a single mode inner core embedded within a concentric multimode outer core within a cladding, wherein said cladding does not cover a window area, wherein said inner core and said outer core terminate at an angled end face, wherein said end face comprises a reflective coating over said outer core, wherein said angled end face and said reflective coating are configured to enable light propagating in said multimode outer core to be reflected from said reflective coating and transmitted through said window.

18. A dual mode fiber optic, comprising:
    a single mode central core terminating at a first area of an end face;
    a multimode outer core fixedly attached and concentric to said central core and terminating at a second area of said end face;
    a reflective coating fixedly attached to said second area; and
    means for coupling (i) multimode light into or out of said multimode outer core and (ii) single mode light into and out of said single mode central core.

* * * * *